(12) United States Patent
Cheng et al.

(10) Patent No.: US 9,235,278 B1
(45) Date of Patent: Jan. 12, 2016

(54) MACHINE-LEARNING BASED TAP DETECTION

(71) Applicant: Amazon Technologies, Inc., Reno, NV (US)

(72) Inventors: Peter Cheng, Sunnyvale, CA (US); Steven Scott Noble, Soquel, CA (US); Matthew Paul Bell, Sunol, CA (US); Yi Ding, Santa Clara, CA (US); Stephen Michael Polansky, Sunnyvale, CA (US); Alexander Li Honda, Sunnyvale, CA (US)

(73) Assignee: Amazon Technologies, Inc., Reno, NV (US)

( * ) Notice: Subject to any disclaimer, the term of this patent is extended or adjusted under 35 U.S.C. 154(b) by 0 days.

(21) Appl. No.: 14/340,455

(22) Filed: Jul. 24, 2014

(51) Int. Cl.
*G06F 3/045* (2006.01)
*G06F 3/038* (2013.01)
*G06F 3/0354* (2013.01)
*G06F 3/0346* (2013.01)
*G06K 9/00* (2006.01)
*G06F 3/0487* (2013.01)

(52) U.S. Cl.
CPC .............. *G06F 3/038* (2013.01); *G06F 3/0346* (2013.01); *G06F 3/03547* (2013.01); *G06F 3/0487* (2013.01); *G06K 9/00523* (2013.01)

(58) Field of Classification Search
CPC ..... G06F 3/044; G06F 3/0487; G06F 3/0488; G06F 3/04883
USPC ................... 345/173–178; 178/18.01–18.06, 178/20.01–20.04
See application file for complete search history.

(56) References Cited

U.S. PATENT DOCUMENTS

| 9,110,576 | B1 * | 8/2015 | Kim et al. | |
| 9,113,073 | B2 * | 8/2015 | Ugawa | |
| 2015/0106767 | A1 * | 4/2015 | Abercrombie et al. | 715/848 |
| 2015/0193111 | A1 * | 7/2015 | Kauffmann et al. | G06F 3/0487 |
| 2015/0234586 | A1 * | 8/2015 | Lee et al. | G06F 3/0488 |

* cited by examiner

*Primary Examiner* — Vijay Shankar
(74) *Attorney, Agent, or Firm* — Novak Druce Connolly Bove + Quigg LLP

(57) ABSTRACT

An electronic device can be configured to enable a user to provide input via a tap of the device without the use of touch sensors (e.g., resistive, capacitive, ultrasonic or other acoustic, infrared or other optical, or piezoelectric touch technologies) and/or mechanical switches. Such a device can include other sensors, including inertial sensors (e.g., accelerometers, gyroscopes, or a combination thereof), microphones, proximity sensors, ambient light sensors, and/or cameras, among others, that can be used to capture respective sensor data. Feature values with respect to the respective sensor data can be extracted, and the feature values can be analyzed using machine learning to determine when the user has tapped on the electronic device. Detection of a single tap or multiple taps performed on the electronic device can be utilized to control the device.

20 Claims, 9 Drawing Sheets

MACHINE-LEARNING BASED TAP DETECTION

BACKGROUND

As electronic devices, such as laptops, tablets, or smartphones, become increasingly sophisticated, new and interesting approaches have arisen for enabling users to interact with such devices. For example, electronic devices have traditionally employed mechanical switches, such as power on/off buttons, volume buttons, alphanumeric keys, navigational keys, among others, for enabling users to provide input to the electronic devices. Many modern electronic devices now include one or more touch sensors (e.g., resistive, capacitive, ultrasonic or other acoustic, infrared or other optical, or piezoelectric touch technology) as alternative or additional ways for enabling users to provide input to their devices. As electronic devices become more powerful and come equipped with new sensors and other input elements, new approaches can be developed to enable users to interact with their electronic devices.

BRIEF DESCRIPTION OF THE DRAWINGS

Various embodiments in accordance with the present disclosure will be described with reference to the drawings, in which.

DETAILED DESCRIPTION

Figure 1A:
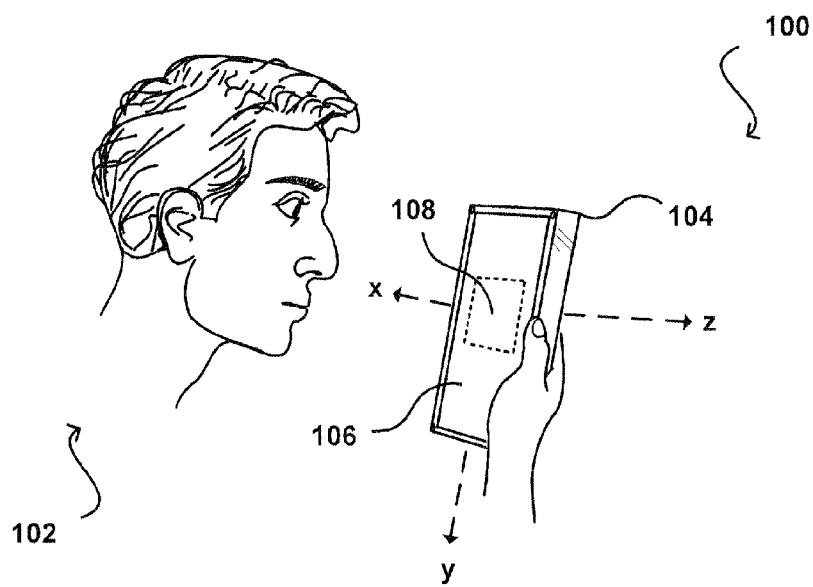
FIGS. 1A and 1B illustrate an example of a user operating an electronic device capable of detecting a tap or multiple taps performed on the device for controlling the device in accordance with an embodiment.

A conventional electronic device may include a touchscreen on a front surface of the device and one or more mechanical switches on the front surface or other surfaces of the device to allow a user to manually provide input to the device for controlling the device. It may also be desirable to configure the electronic device to enable the user to provide input to the device in other ways without the expense of incorporating additional touch sensors and/or mechanical buttons on every surface of the device. In particular, it may be advantageous for the electronic device to be capable of recognizing a single tap or multiple taps on various surfaces of the device without the use of touch sensors or mechanical switches. For example, a user can maintain an unobstructed view of the touchscreen yet control the device by tapping on a top, bottom, side, and/or back surface of the device. A device capable of detecting one or more taps for controlling the device can also facilitate single-handed operation of the device. In addition, such an approach can be more immediately responsive to the user's intended operation of the device. For instance, the user can perform a selection or other command via tap(s) using the same hand(s) holding the device, which can enable the user to provide a more immediate input to the device than a touch gesture using a hand not holding the device or a more complex touch gesture such as a swipe.

Systems and methods in accordance with various embodiments of the present disclosure overcome one or more of the above-referenced and other deficiencies in conventional approaches for detecting user input to an electronic device. In various embodiments, sensor data is captured by a plurality of sensors or other input elements, such as one or more inertial sensors (e.g., accelerometers, gyroscopes, or a combination thereof), microphones, proximity sensors, ambient light sensors, and/or cameras, among others. The sensor data can be analyzed using a machine-learned model to determine whether a user has tapped the electronic device. Detection, according to the model, of a single tap or multiple taps can be interpreted by the electronic device as a selection or command by the user for controlling the device. In various embodiments, machine learning includes an off-line phase that involves collecting training data comprising samples of sensor data for instances when users have tapped their electronic devices and instances when users have not tapped their electronic devices. Feature values with respect to the sensor data can be extracted for those instances corresponding to a user tap and those instances not corresponding to a user tap, and the feature values can be utilized to train one or more machine-learned models to detect single taps or multiple taps performed on an electronic device.

In some embodiments, a machine-learned model may be a binary classifier that distinguishes between instances of taps performed on the device and instances not corresponding to taps performed on the device. Multiple binary classifiers can be combined to detect one or more taps performed on the top, bottom, sides, front, and/or back of a device. In other embodiments, the machine-learned model may be a multiclass classifier that is capable of distinguishing among top taps, bottom taps, side taps, front taps, and/or back taps performed on an electronic device. A continuous evaluation may be performed in some embodiments, whereby a sliding window of time is used to attempt to detect tap events that occur within the sliding window. Some tap actions function as a virtual button on the device, whereby input to perform certain functions through a tap is analogous to the pressing of a virtual button. Some multiclass classifiers may be capable of recognizing even more granular tap locations, such as top-left taps, top-center taps, and top-right taps or northwest quadrant, northeast quadrant, southwest quadrant, and southeast quadrant back taps. The machine-learned model(s) can be utilized in real time or substantially real time by a particular electronic device to determine whether a user of that particular device has tapped the device by analyzing the sensor data captured by that particular device.

Various other functions and advantages are described and suggested below in accordance with the various embodiments.

Figure 1B:
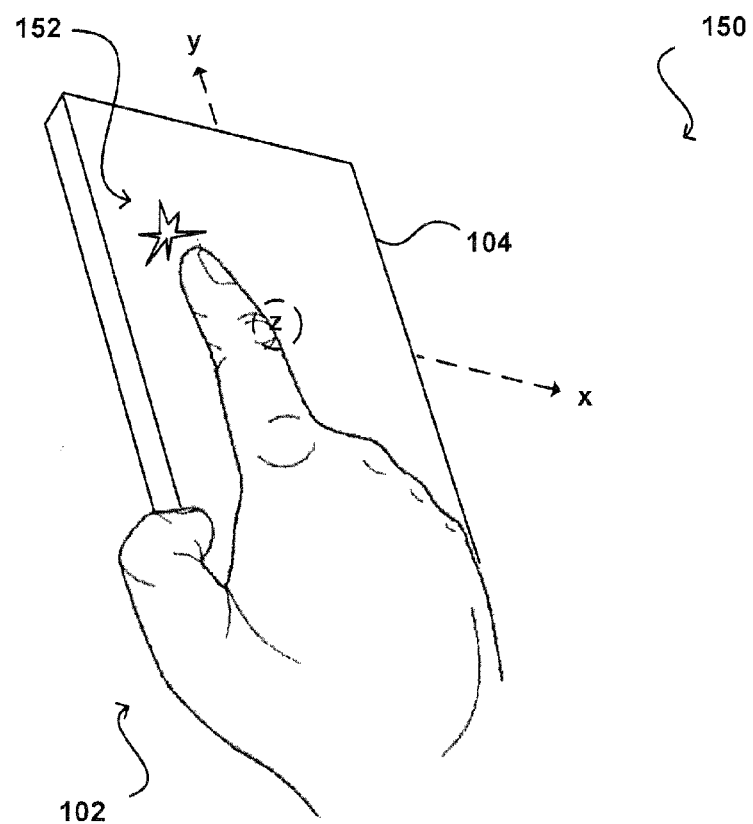

FIGS. 1A-1B illustrate an example of a user operating an electronic device capable of detecting a tap or multiple taps of the device as input for controlling the device in accordance with an embodiment. In the example situation 100 of FIG. 1A, a user 102 can be seen viewing a touchscreen 106 of an electronic device 104. Although a portable electronic device (e.g., a smart phone, tablet, or e-book reader) is shown that can be held in the user's hands, it should be understood that other types of electronic devices can utilize aspects of the various embodiments as should be apparent in light of the teachings and suggestions contained herein. In this example, the electronic device 104 incorporates an inertial sensor 108, such as a three-axis accelerometer, a three-axis gyroscope, or a combination thereof. The three-axis accelerometer is capable of measuring acceleration forces applied to the electronic device along the x- (lateral), y- (longitudinal), and z- (vertical) axes (e.g., in G-force (g) or 9.81 m/s$^2$). The three-axis gyroscope is capable of measuring the device's rate of rotation around the x-, y-, and z-axes (e.g., in radians per second). In some embodiments, an electronic device may incorporate a nine-axis inertial measurement unit (IMU) comprising a three-axis accelerometer, three-axis gyroscope, and three-axis magnetometer. In other embodiments, a device can include one or more accelerometers, gyroscopes, and/or magnetometers (each being single-axis, two-axis, and/or or three-axis) as discrete elements. In various embodiments, an electronic device can also incorporate other sensors, including one or more microphones, proximity sensors, ambient light sensors, and/or cameras, among others, that can be used in addition to accelerometers, gyroscopes, and magnetometers for detecting one or more taps to the device by a user.

FIG. 1B illustrates a situation 150 of user 102 performing a tap 152 on a "back" surface of an electronic device 100. It should be understood that, while the tap 152 is performed on the "back" of the device, the user can also perform a tap on the "top," "bottom," "side," or "front" of the device as well (or instead). Further, directions such as "back," "top," "bottom," "side," or "front" are used for purposes of explanation and are not intended to require specific orientations unless otherwise stated. In this example, respective sensor data for each axis of the inertial sensor 108 (e.g., a three-axis accelerometer, a three-axis gyroscope, or a combination thereof) can be captured during a first period of time that the user taps the back of the device. A respective feature value vector can extracted from each of the sensor data during the first period of time or at a second period of time, and the feature value vectors are evaluated according to a machine-learned model or classifier that determines or classifies that the extracted feature value vectors correspond to the user tapping the back of the electronic device. The back of the device can function as a "virtual button," and the detected tap can cause an action to be performed by the electronic device, such as turning the device off, turning audio on/off, dismissing notifications or screen alerts, among other possibilities. As mentioned, in some embodiments, other sensor data can also be captured from microphones, proximity sensors, ambient light sensors, magnetometers, and/or cameras, etc. Additional feature value vectors can also be extracted from these additional sensor data, and these additional feature value vectors can also be evaluated by the machine-learned model to determine whether the user has tapped the device. Although the example of FIG. 1B involves capturing sensor data from each axis of a three-axis accelerometer and/or a three-axis gyroscope, it should be understood that other embodiments may capture inertial sensor data from only an accelerometer or only a gyroscope. Further, inertial sensor data may be captured from only a single axis or two axes of an accelerometer and/or gyroscope.

Figure 2:
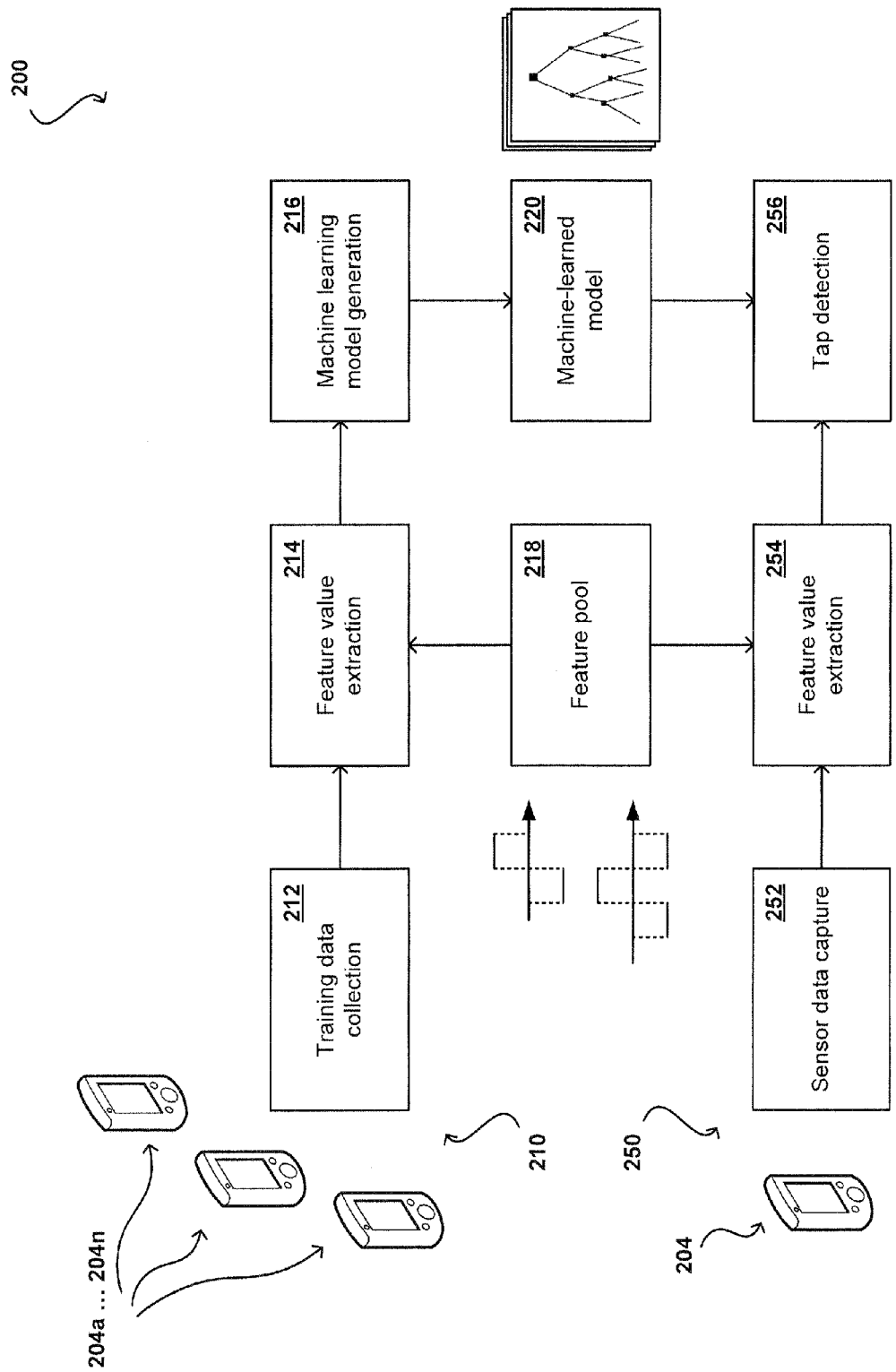
FIG. 2 illustrates an example of a process for configuring an electronic device capable of detecting a tap or multiple taps performed on the device for controlling the device in accordance with an embodiment.

FIG. 2 illustrates an example process 200 for configuring an electronic device to be able to detect a tap of an electronic device for controlling the device in accordance with an embodiment. In this example, the process 200 includes an off-line stage 210 that is performed to generate a machine-learned model 220 that can be utilized by an electronic device to determine whether the device has been tapped. It should be understood that, for any process discussed herein, there can be additional, fewer, or alternative steps performed in similar or alternative orders, or in parallel, within the scope of the various embodiments unless otherwise stated. The off-line stage can begin with collecting training data 212 for determining instances of a tap of a device and instances that do not correspond to the tap of the device. In an embodiment, the training data comprises the readings of at least one accelerometer (e.g., single-, two-, or three-axis), at least one gyroscope (e.g., single-, two-, or three-axis), or both, from several user devices 204a-204n of a particular model. In other embodiments, the training data can further comprise sensor data gathered from one or more other sensors, including a magnetometer, a microphone, a proximity sensor, an ambient light sensor, and/or a camera, among other sensors or input elements. The training data can be collected from one or more users each using their respective electronic devices of the same model to ensure that deviations in the training data are not due to differences among device models such as dimensional differences (e.g., length, width, height, weight, etc.) or component differences (e.g., sensor model, sensor firmware, CPU clock, etc.).

In some embodiments, the training data can include sensor data captured when a user has tapped the top of the device, the bottom of the device, the left side of the device, the right side of the device, the back of the device, or the front of the device. The training data is also captured for when the device has not been tapped by the user. The training data, whether corresponding to user taps of the device or not corresponding to user taps of the device, is captured under a variety of conditions, such as while the device is lying flat on a surface, the device is in a portrait orientation, the device is in a landscape orientation, the device is held at various angles of tilt with respect to a user, the device is kept in a user's pocket, a user is walking with the device, a user is running with the device, a user is traveling upstairs or downstairs with the device, a user is driving with the device, or a user is flying with the device, among other situations.

During training data collection 212, the captured sensor data can be manually classified according to a desired implementation for tap detection. In various embodiments, the training data can be labeled according to a binary classification scheme. For example, a device can be configured to detect a user tap to the back of the device as input for controlling the device. Instances of taps to the back of the device are classified or labeled as positive examples. In certain of these embodiments, taps to the top, bottom, side, and/or front of the device can be included for deriving the machine-learned model for back tap detection but these instances of top, bottom, side, and/or front taps may be classified as negative examples of back taps. Additional binary classifiers can be generated for other types of user taps. For instance, a same or different device can be configured to detect a user tap to the "absolute top" of the device by generating a machine-learned model that is based on training data that includes classifications of instances of taps to the "absolute top" of the device as positive examples and classifications of "absolute bottom," "absolute left side", "absolute right side," front, and/or back taps and instances not corresponding to taps as negative examples. As used herein, "absolute top" refers to designation of one side of the device as the top of the device regardless of the orientation of the device with respect to the user, and "absolute bottom," "absolute left", and "absolute right" follow from the "absolute top" designation. As will be appreciated by those of ordinary skill, a device can also be configured to detect "absolute bottom," "absolute left" side, "absolute right" side, and front taps using separate binary classifiers for each of these additional types of user taps.

Another example of a binary classification scheme is to classify all types of taps—top, bottom, side, front, and/or back—as positive examples of user taps, and to classify instances not corresponding to taps as negative examples. In this scheme, all taps will be identified simply as a tap, without differentiating which device surface was tapped.

In certain situations, it may be desirable to not generate an inertial tap event from a tap on the touchscreen of the device, since this input is typically intended for the existing touchscreen sensor system (e.g., capacitive or resistive sensor, and existing system software). In these situations, touches on the screen can be detected by the existing sensors and software. In some embodiments, taps to the touchscreen can "override" machine-learning based taps. An override can occur after a touchscreen tap is detected, whereby machine-learning based taps that may occur at the same time or substantially the same time (e.g., within a few hundred milliseconds) are suppressed. In other embodiments, a machine-learned model could be trained to disambiguate between touchscreen taps and taps to other surfaces of an electronic device by collecting training data of instances of taps to the touchscreen and labeling such instances as negative examples.

In other embodiments, the training data can be labeled according to a multiclass classification scheme. That is, instances of taps to the top of the device can be labeled as top taps, instances of taps to the bottom of the device can be labeled as bottom taps, instances of taps to the left side of the device can be labeled as left taps, etc. A machine-learned model derived from such training data may be capable of differentiating among user taps at various locations of the device (e.g., top, bottom, left side, right side, back, and/or front). In some embodiments, the training data may be additionally or alternatively classified according to more granular locations (e.g., top-left, top-center, top-right; top-left, top-middle-left, top-middle-right, top-right; left-top, left-center, left-bottom; back-northwest quadrant, back-northeast quadrant, back-southwest quadrant, back-southeast quadrant; etc.). Various other classification schemes can be used as well within the scope of various embodiments. A machine-learned model generated from such training data may be designed to analyze input data to classify the input data as corresponding to these specific locations of a user tap or classify the input data as not corresponding to a user tap.

After the training data has been captured and manually labeled according to an appropriate classification scheme, feature value vectors can be extracted from the captured sensor data 214 using a feature pool 218. In an embodiment, the feature pool 218 from which the feature value vectors are determined comprise one-dimensional (1D) Haar-like features. Haar-like features are based on Haar wavelets, sequences of square-shaped functions of varying scales. Two-dimensional (2D) Haar-like features are conventionally used for recognizing objects within two-dimensional image data, such as discussed in Viola, Paul, and Michael Jones. "Rapid object detection using a boosted cascade of simple features."

In *Computer Vision and Pattern Recognition,* 2001. *CVPR* 2001. *Proceedings of the* 2001 *IEEE Computer Society Conference* on, vol. 1, pp. 1-511. IEEE, 2001, which is incorporated herein by reference. Viola Jones object detection uses simple rectangular Haar-like features at various scales and positions to characterize an image. One of the basic patterns for the 2D Haar-like features used by Viola Jones object detection is a two-rectangle feature having the same size and shape and being horizontally or vertically adjacent. The value of the two-rectangle feature is the difference between the respective sums of the pixels of the two rectangular regions. Viola Jones object detection also defines a three-rectangle feature whose value is the sum of the pixels in a center rectangle subtracted from the respective sums of the pixels of two outside rectangles, and a four-rectangle feature whose value is the difference of the respective sums of pixel of diagonal pairs of rectangles.

In various embodiments, Viola Jones object detection is adapted for analyzing 1D sensor data signals using 1D Haar-like features to characterize the 1D sensor data signals used for tap detection. In an embodiment, one 1D Haar-like feature utilized for tap detection may be a two-region feature having regions of equal length and the basic pattern of $\{-1, 1\}$, and another 1D Haar-like feature may be a three-region feature having regions of equal length and the basic pattern of $\{-1, 1, -1\}$, The value of the two-region Haar-like feature is the sum of the sensor signal data of one region subtracted from the sum of the sensor signal data of the other region, and the value of the three-region Haar-like feature is the sum of the sensor signal data of a center region subtracted from the respective sums of the sensor signal data of two outer regions. Additional Haar-like features can be derived from these basic patterns by varying the length of the regions (e.g., $\{-1, -1, 1, 1\}$; $\{-1, -1, 1, 1, -1, -1\}$; $\{-1, -1, -1, 1, 1, 1\}$; $\{-1, -1, -1, 1, 1, 1, -1, -1, -1\}$; etc.), shifting the Haar-like features by various amounts (e.g., $\{0, -1, 1\}$; $\{0, -1, 1, -1\}$; $\{0, 0, -1, 1\}$; $\{0, 0, -1, 1, -1\}$; etc.), or a combination thereof. In other embodiments, Haar-like features may comprise other various patterns, including those that may not have regions of equal length. For example, another basic pattern for a Haar-like feature could be represented as $\{-1, -1, 1, 1, 1, 1, -1\}$. This basic pattern can be scaled and/or shifted for inclusion as part of a pool of features to be used for tap detection.

In some embodiments, feature pool 218 can be statically defined. In other embodiments, feature pool 218 can be dynamically generated. An advantage of using Haar-like features is the low calculation cost for determining the feature vectors from the captured sensor data. Feature value vectors derived from Haar-like features require only addition and subtraction operations, and the values for these features can be calculated in constant time. To rapidly compute the values for the Haar-like features, an "integral buffer" can be computed from the sensor data. An integral buffer is an adaptation of Viola Jones object detection's integral image, and is discussed in further detail elsewhere herein.

The next step of the off-line phase is generating a machine-learned model from the training data 216 using a suitable machine-learning algorithm from among decision trees, random forest, boosting, support vector machines, neural networks, logistic regression, among other machine-learning algorithms. Decision trees are trees that classify instances by sorting them based on feature values. Each node in a decision tree represents a feature in an instance to be classified, each branch represents a possible value of the node, and each leaf node represents a classification or decision. Generally, the feature that best divides the training data would be the root node of the tree, and higher-level nodes will typically divide the training data better than lower-level nodes. Examples of decision-tree algorithms include Iterative Dichotomiser 3 (ID3); C4.5, which is the successor of ID3; C5.0/See5, which is the successor to C4.5; and Classification and Regression Tree (CART).

A random forest is a classifier comprising a combination of decision trees in which each tree depends on the values of a random vector sampled independently and with the same distribution for all trees in the forest. A random forest can be trained for some number of trees T by sampling N cases of the training data at random with replacement to create a subset of the training data; the subset can be about 66% of the total training data. At each node, a number m of the features are selected at random from the set of all features. The feature that provides the best split is used to do a binary split on that node. At the next node, another number m of the features are selected at random and the process is repeated.

Boosting algorithms are based on the premise that a series of "weak" classifiers (e.g., classifiers that may only accurately predict an outcome a little more than half of the time) can be combined to create a "strong" classifier (e.g., a classifier capable of predicting an outcome according to a desired level of accuracy). An example of a boosting algorithm is Adaptive boosting or AdaBoost, which is a machine learning boosting algorithm which finds a highly accurate classifier (i.e., low error rate) from a combination of many "weak" classifiers (i.e., substantial error rate). Given a data set comprising examples that are within a class and not within the class and weights based on the difficulty of classifying an example and a weak set of classifiers, AdaBoost generates and calls a new weak classifier in each of a series of rounds. For each call, the distribution of weights is updated that indicates the importance of examples in the data set for the classification. On each round, the weights of each incorrectly classified example are increased, and the weights of each correctly classified example is decreased so the new classifier focuses on the difficult examples (i.e., those examples have not been correctly classified).

A support vector machine (SVM) is generally a binary classifier. Given labeled training data comprising instances of a first class or a second class, an SVM training algorithm builds a model capable of assigning new instances to one of the first class or the second class by finding an optimal hyperplane, i.e., a hyperplane that separates the training data between the two classes and maximizes the gap or "margin" between instances of the two classes. When a linear separator cannot be found, the training data can be projected to a higher-dimensional space using kernel techniques where the training data effectively becomes linearly separable. Finding the hyperplane can be formulated as a quadratic optimization problem that can be solved by known techniques.

Neural networks are inspired by biological neural networks and consist of an interconnected group of functions or classifiers that process information using a connectionist approach. Neural networks change their structure during training, such as by merging overlapping detections within one network and training an arbitration network to combine the results from different networks. Examples of neural network algorithms include the multilayer neural network, the autoassociative neural network, the probabilistic decision-based neural network (PDBNN), and the sparse network of winnows (SNoW).

Logistic regression is a type of probabilistic statistical classification model that can operate as a binary classifier. Probabilities of the possible outcomes of a single trial are modeled as a function of one or more independent variables or features using a logistic function. This is an S-shaped function that can be used to fit data in various ways. Logistic regression measures the relationship between a classification and the one or more independent variables or features by using probability scores as the predicted values of the classification.

The process 200 for configuring an electronic device for tap detection also includes a stage that occurs in real time or substantially real time 250. This part of the process begins with capturing of sensor data 252 by a particular electronic device 204. As mentioned, the sensor data that can be captured includes inertial sensor data, such as for each axis of one or more single-, two-, or three-axis accelerometers, gyroscopes, or a combination thereof. In other embodiments, additional sensor data can also be obtained using one or more other sensors or input elements, including magnetometer(s), microphone(s), proximity sensor(s), ambient light sensors, and/or cameras(s), among others. In various embodiments, sensor data from one or more axes of the accelerometer and/or gyroscope and/or from each of the additional sensors that may be used for detecting a user tap can be stored in a respective circular buffer such that the oldest data is overwritten by the newest captured sensor data. The real-time stage can continue with extracting feature values from the captured sensor data 254 using a set of features 218 common to those used for extracting feature values from the training data 214. The extracted feature values are evaluated according to the machine-learned model 220 to determine whether the feature values correspond to a tap of the device or do not correspond to a tap of the device 256. When the device determines that a user has tapped the device, including a single tap or multiple taps, the tap(s) of the device can operate as an input gesture that can cause an action to be performed by the device, such as powering off the device, controlling audio, clearing notifications or screen alerts, among other actions.

Figure 3A:
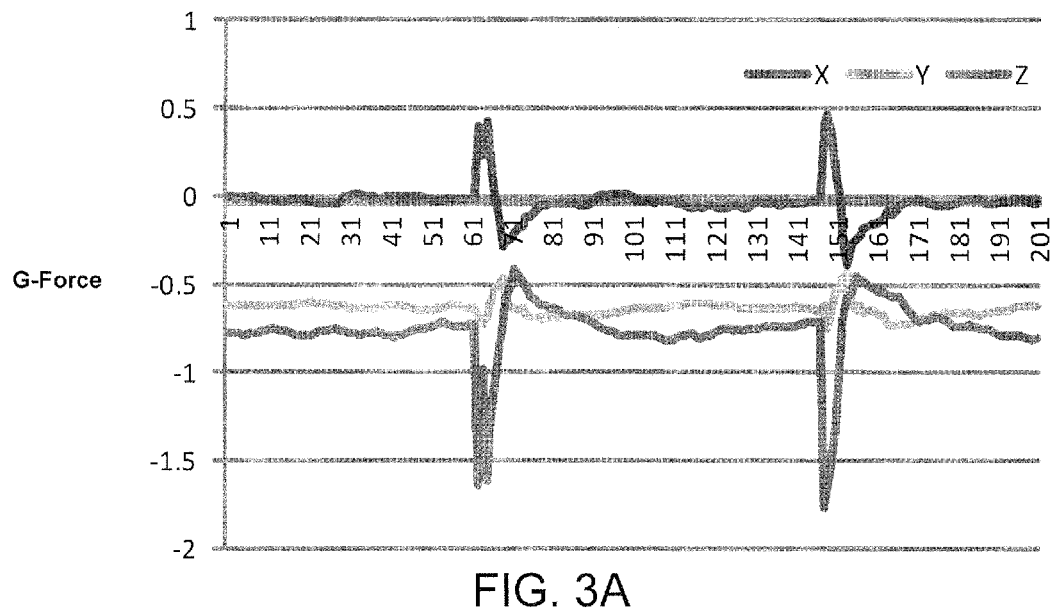
FIGS. 3A-3B illustrate examples of sensor data captured by an electronic device capable of detecting a tap or multiple taps performed on the device for controlling the device in accordance with an embodiment.
Figure 3B:
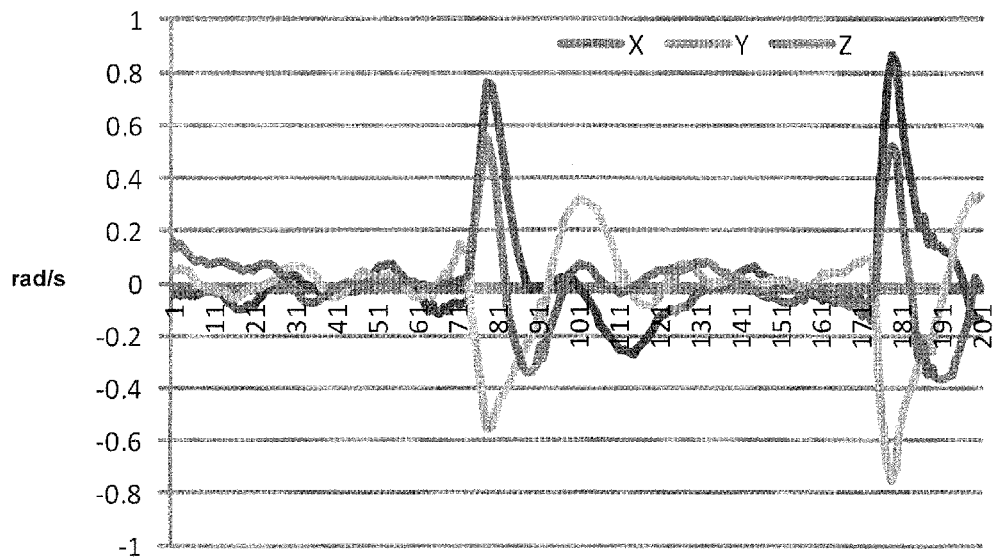

FIG. 3A-3B illustrate examples of sensor data captured by an electronic device in accordance with an embodiment. The capturing of the sensor data can be part of off-line training data gathering 212 of FIG. 2 or part of real-time sensor data capture 252 of FIG. 2. FIG. 3A plots the accelerometer data for when a user taps an electronic device twice on the back of the device during a period of time. The accelerometer is a three-axis accelerometer, including an x-, y-, and z-axis, that is sampled at a rate of approximately 100 Hz. The electronic device, in which the accelerometer is incorporated, is being held by a user in a similar manner to that depicted in the example situation 100 of FIG. 1A. That is, the device is being held in portrait orientation with a slight tilt with respect to the user such that the bottom of the device is closer to the user than the top of the device. As a result, the accelerometer reading is approximately 0 g along the x-axis and between −0.5 and −1.0 g's along the y-axis and z-axis when the device is not being tapped. When the device is tapped, the accelerometer reading approaches 0.5 g along the x-axis and −1.5 g's along the z-axis. In this example, the accelerometer reading does not change as significantly along the y-axis but there is nonetheless a perceivable difference when the device is being tapped and when the device is not being tapped. As discussed, although sensor data is captured for each axis of the accelerometer in the example of FIG. 3A, other embodiments may instead capture sensor data from one or two axes of the accelerometer or may not capture sensor data from an accelerometer.

FIG. 3B plots gyroscope data for when a user taps the same electronic device as illustrated in FIG. 3A twice on the back of the device during the same period of time. The gyroscope is a three-axis gyroscope, including an x-, y-, and z-axis, that is also sampled at a rate of approximately 100 Hz. As can be seen from FIG. 3B, the gyroscope reading is approximately 0 rad/s along the x-, y-, and z-axes when the device has not been tapped. In this example, when the device is tapped, the accelerometer reading approaches or exceeds 0.8 rad/s along the x-axis, approaches 0.6 rad/s along the z-axis, and approaches or exceeds −0.6 rad/s along the y-axis. In this example, the peaks and valleys of the gyroscope readings appear to occur 20-30 samples after the peaks and valleys of the accelerometer readings. It should be understood, however, that these rates are merely examples and that these numbers may be on the low side for a tap in accordance with various implementations. As discussed, although sensor data is captured for each axis of the gyroscope in the example of FIG. 3B, other embodiments may instead capture sensor data from one or two axes of the gyroscope or may not capture sensor data from a gyroscope.

Figure 4A:
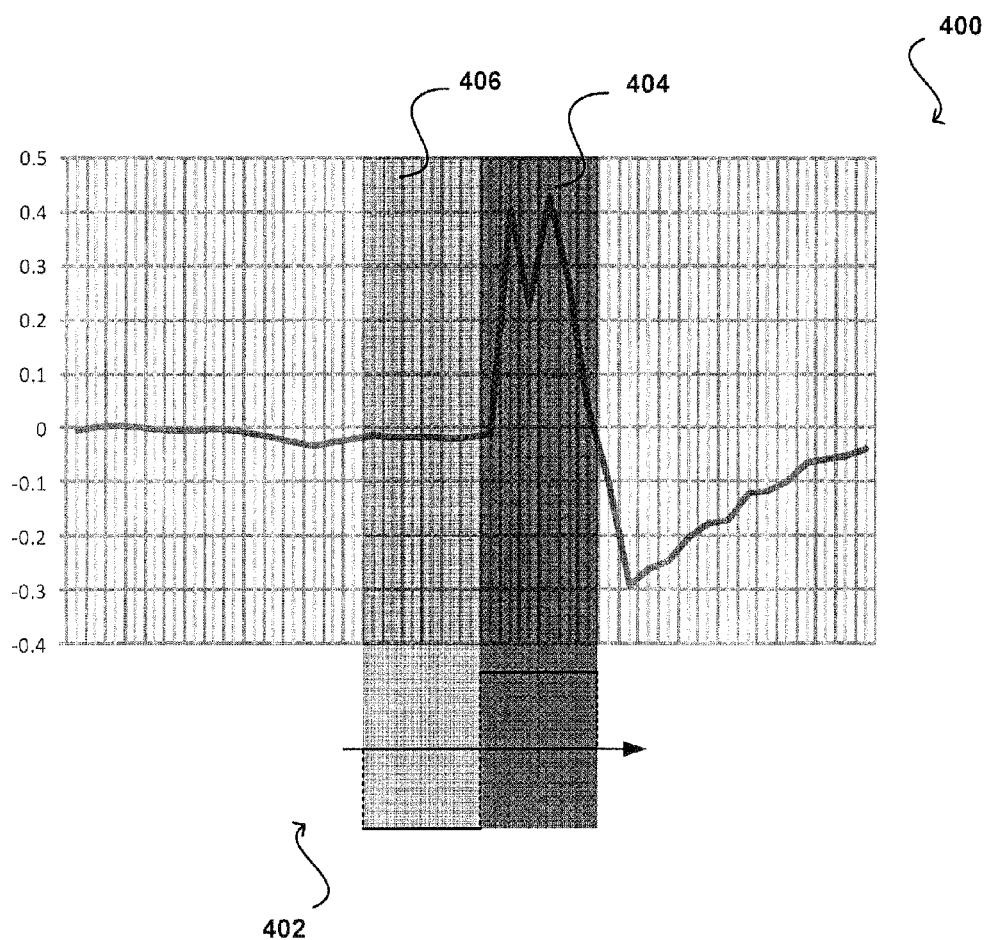
FIGS. 4A-4B illustrate an example approach for extracting values of features with respect to sensor data captured by an electronic device capable of detecting a tap or multiple taps performed on the device for controlling the device in accordance with an embodiment.
Figure 4B:
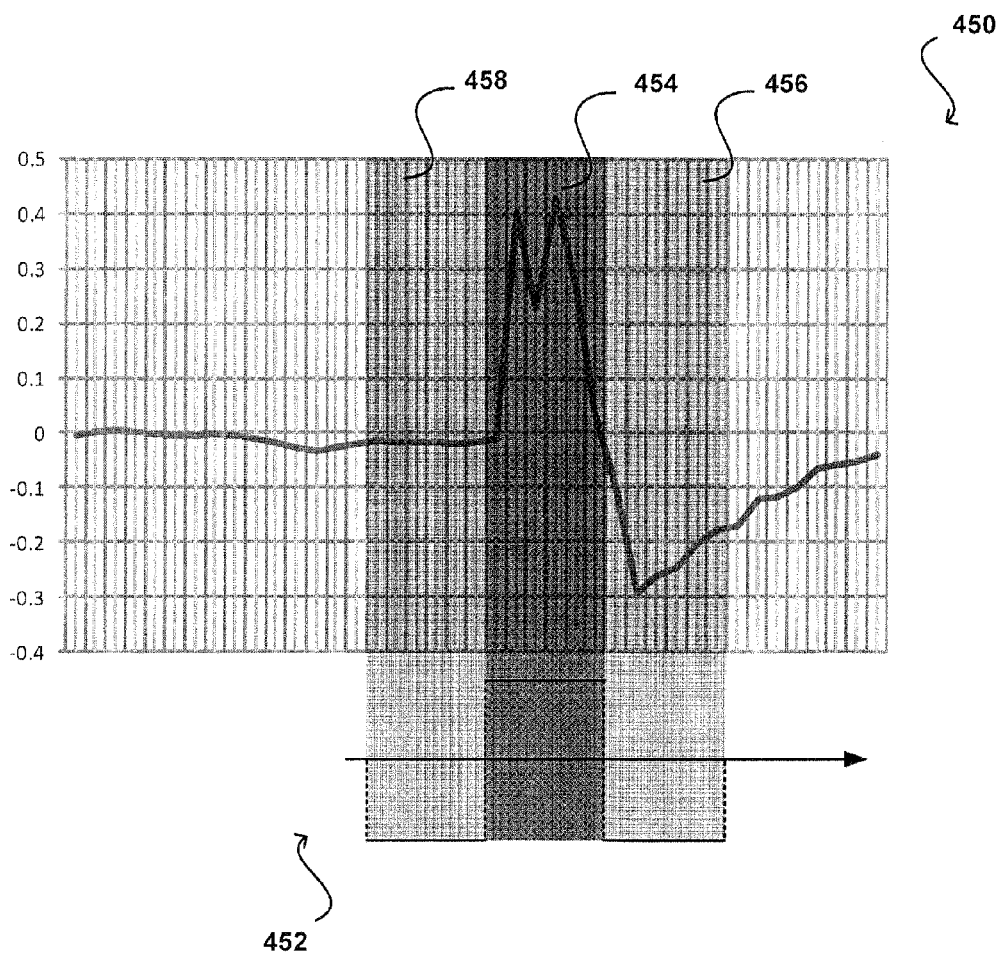

FIG. 4A-4B illustrate an example approach for extracting values of features with respect to sensor data in accordance with an embodiment, such as the offline feature value extraction stage 214 of FIG. 2 or the real time feature value extraction stage 254 of FIG. 2. In FIG. 4A, a window 400 from approximately the $40^{th}$ reading to approximately the $80^{th}$ reading of the x-axis of the accelerometer data illustrated in FIG. 3A is shown. As mentioned, the readings for the x-axis of the accelerometer can be stored in a circular buffer $V_{accel\_x} = [\ldots, s_{40}, s_{41}, s_{42}, \ldots s_{80}, \ldots]$ where $s_n$ is the value of the signal at sample n. Feature value vectors are calculated for each buffer of sensor data $V_s$ (e.g., $V_{accel\_x}$, $V_{accel\_y}$, $V_{accel\_z}$, $V_{gyro\_x}$, $V_{gyro\_y}$, $V_{gyro\_z}$, etc.) using a pool of Haar-like features. In an embodiment, the pool of Haar-like features comprises two- and three-region wavelets having regions of equal length of various lengths and various amounts of shift over a window of $V_s$. A two-region Haar-like has a basic pattern of $\{-1, 1\}$. For example, a first two-region Haar-like feature may be represented as $\{-1, -1, -1, 1, 1, 1\}$. Another two-region Haar-like feature may have regions of the same length as the first Haar-like feature but may be shifted by a first amount and could be represented as $\{0, -1, -1, -1, 1, 1, 1\}$. Yet another two-region Haar-like feature may have regions of even greater length and be shifted by a second amount, and, thus, could be represented as $\{0, 0, -1, -1, -1, -1, 1, 1, 1, 1\}$. A three-region Haar-like feature has a basic pattern of $\{-1, 1, -1\}$. Other three-region Haar-like features may have regions of different lengths (e.g., $\{-1, -1, 1, 1, -1, -1\}$; $\{-1, -1, -1, 1, 1, 1, -1, -1, -1\}$; etc.) and/or different amounts of shift (e.g., $\{0, -1, 1, -1\}$; $\{0, 0, -1, 1, -1\}$; etc. A value for a Haar-like feature with respect to a vector of sensor data $V_s$ can be calculated by obtaining the sum of the sensor readings for those positions of the Haar-like feature having a value of 1 and subtracting the sum of the sensor readings for those positions of the Haar-like feature having a value of −1. A feature value vector for each $V_s$ can be computed by calculating the value for each Haar-like feature of the feature pool with respect to $V_s$. It should be understood that in various embodiments the Haar-like features may vary in segment length, such as where the first segment has a different length from the other segments (e.g., $\{0, 0, -1, -1, 1, 1, 1, 1, -1\}$).

Returning to the example of FIG. 4A, a Haar-like feature 402 is illustrated with respect to the window 400 of $V_{accel\_x}$. Haar-like feature 402 may be represented as $\{\ldots, 0, -1, -1, -1, 1, 1, 1, 0, \ldots\}$. To obtain the value of this Haar-like feature with respect to $V_{accel\_x}$, a dot product of the Haar-like feature and the sensor signal could be performed. That is, the sum of each of the values of the first region 404 is subtracted from the sum of each of the values of the second region 406 to obtain the value of this Haar-like feature. In various embodiments, an "integral buffer" $I_s$ can be used to rapidly compute the feature value vector for each buffer of sensor data $V_s$. Each element n of the integral buffer $I_s$ is the summation of sensor signal value at n and all prior elements to n, and the value of an element n of the integral buffer $I_s$ can be defined as:

$$I_s(n) = \Sigma_{k \leq n} s_k,$$ (Equation 1)

where $s_k$ is the sensor data value at a position k≤n in $V_s$. For example, to calculate the value of the Haar-like feature 402 with respect to the window 400 of $V_{accel\_x}$ without an integral buffer would require six addition and subtraction operations, including summing the values of the first region 404, $s_{58}$, $s_{59}$, and $s_{60}$, and subtracting the values of the second region 406, $s_{55}$, $s_{56}$, and $s_{57}$. Instead of such an approach, the integral buffer can be calculated for $V_{accel\_x}$. The integral buffer $I_s$ could be calculated as $[c+s_{55}, c+s_{55}+s_{56}, c+s_{55}+s_{56}+s_{57}, c+s_{55}+s_{56}+s_{57}+s_{58}, c+s_{55}+s_{56}+s_{57}+s_{58}+s_{59}, c+s_{55}+s_{56}+s_{57}+s_{58}+s_{59}+s_{60}]$ for 55≤n≤60, where c is a constant that represents the sum of the sensor data further back in time. In an embodiment, the value of c is periodically subtracted from all of the elements of each buffer $I_s$ to avoid numerical overflow issues. This can occur infrequently to reduce the extra computational work. The sum of the values of any region of $V_s$ can be simplified to a single subtraction as:

$$\Sigma_k^n s_n = I_s(n) - I_s(k-1)$$ (Equation 2)

The value of the Haar-like feature 402 can now be calculated in three operations using the integral buffer $I_s$:

$$[I_s(s_{60}) - I_s(s_{57})] - [I_s(s_{57}) - I_s(s_{54})]$$

FIG. 4B illustrates an example of extracting a value of a three-region Haar-like feature with respect to a window 450 from approximately the $40^{th}$ reading to approximately the $80^{th}$ reading of the x-axis of the accelerometer data depicted in FIG. 3A. In this example, Haar-like feature 452 may be represented as $\{\ldots, 0, -1, -1, -1, 1, 1, 1, -1, -1, -1, 0, \ldots\}$. To obtain the value of this Haar-like feature, the sum of each of the values of the first region 454 is subtracted from the sum of each of the values of the second region 456 and the sum of each of the values of the third region 458. Without the use of the integral buffer, computing this Haar-like feature would take as much as 9 addition and subtraction operations. With the use of the integral buffer, calculating the value of the Haar-like feature 452 with respect to $V_{accel\_x}$ is reduced to five operations:

$$[I_s(s_{60}) - I_s(s_{57})] - [I_s(s_{57}) - I_s(s_{54})] - [I_s(s_{54}) - I_s(s_{51})].$$

Figure 5:
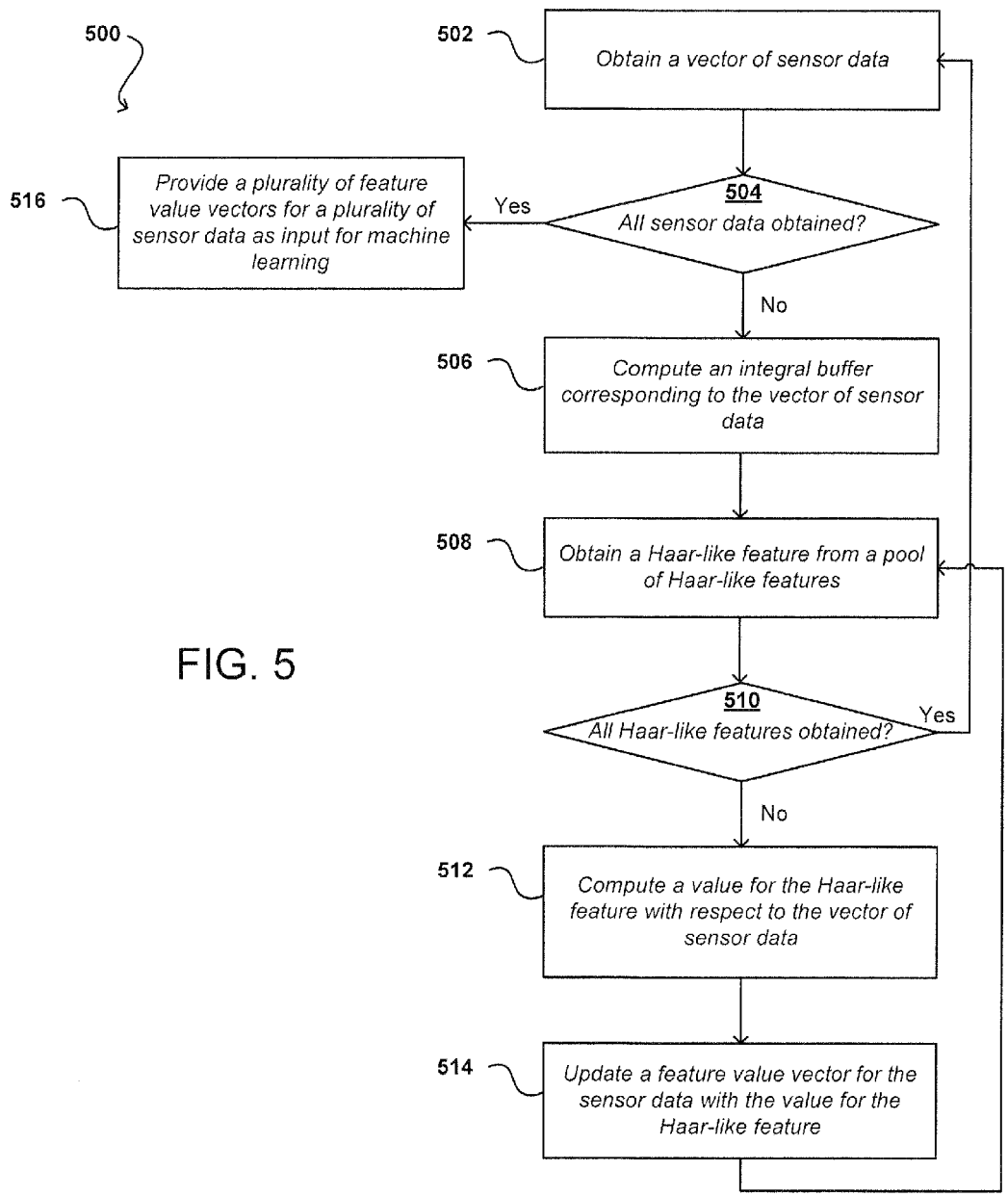
FIG. 5 illustrates an example process for determining feature value vectors from sensor data captured by an electronic device capable of detecting a tap or multiple taps performed on the device for controlling the device in accordance with an embodiment.

FIG. 5 illustrates an example process 500 for determining a feature value vector from sensor data captured by an electronic device capable of detecting a tap or multiple taps performed on the device for controlling the device in accordance with an embodiment. The process begins by obtaining a respective vector of sensor data $V_s$ 502 for each of the sensors used for tap detection. For illustrative purposes, let $V_1 = [1, 2, 3, 4, 5, 6, 7, 8]$. A respective integral buffer $I_s$ is then calculated 506 for each $V_s$. As discussed, each value n of integral buffer $I_s$ is the sum of the sensor signal value at n and all elements prior to n. Thus, for the above example $V_1$, $I_1 = [1, 1+2, 1+2+3, 1+2+3+4, 1+2+3+4+5, 1+2+3+4+5+6, 1+2+3+4+5+6+7, 1+2+3+4+5+6+7+8] = [1, 3, 6, 10, 15, 21, 28, 36]$. A Haar-like feature $H_y$ is then obtained from a pool of Haar-like features 508, where y is the size of the feature pool. An example two-region Haar-like feature $H_1$ can be defined as $H_1 = [0, 0, -1, -1, 1, 1, 0, 0]$ where the first region comprises those values of $H_1$ equal to 1, i.e. the $5^{th}$ and $6^{th}$ positions of $H_1$, and the second region comprises those values of $H_1$ equal to −1, i.e. the $3^{rd}$ and $4^{th}$ positions of $H_1$. The value for $H_1$ with respect to $V_s$ is computed 512 by subtracting the sum of the sensor values corresponding to the first region from the sum of the sensor values corresponding to the second region. The integral buffer can be used to rapidly compute these sums. For example, the sum of the first region can be calculated as $I_1(6)-I_1(4)=21-10=11$, and the sum of the second region can be calculated as $I_1(4)-I_1(2)=10-3=7$. The value for $H_1$ with respect to $V_s$ is the difference of these sums, i.e., $11-7=4$. A feature value matrix or a set of feature value vectors $F_{x,y}$ can be updated 514 with the value for $H_1$ with respect to $V_1$, where x is the number of sensors being used for tap detection and y is the size of the Haar-like feature pool. In this instance, $F_{1,1}$ would be updated with the value of 4.

Another example two-region Haar-like feature $H_2$ can be defined as $H_2=[-1,-1,-1,-1,1,1,1,1]$ where the first region comprises the $5^{th}$ through $8^{th}$ positions of $H_2$, and the second region comprises the $1^{st}$ through $4^{th}$ positions of $H_2$. The value for $H_2$ with respect to $V_s$ can be computed using the same approach discussed above, i.e., the value for $H_2$ with respect to $V_s$ equals $[I_s(8)-I_s(4))-I_s(4)-I_s(0))]=[(36-10)-(10-0)]=[26-10]=16$. The feature value matrix/set of feature value vectors can be updated with the value for $H_2$ with respect to $V_s$, i.e., $F_{1,2}$ would be updated with the value of 16. Steps 508, 512, and 514 can be repeated until values for all of the Haar-like features are determined. A determination 510 can be made when all of the values for the feature pool are computed to continue processing another vector of sensor data $V_s$ 502. A determination 504 can be made when all of the vectors of sensor data $V_s$ are processed, upon which the feature value matrix/set of feature value vectors can be provided as input for machine learning 516. For example, the feature value matrix/set of feature value vectors can be used for training a machine learning model, such as in the machine learning model generation stage 216 of FIG. 2 or the feature value matrix/set of feature value vectors can be evaluated according to a machine-learned model to detect a tap, such as in the tap detection stage 256 of FIG. 2.

In some embodiments, feature values can be computed on demand to reduce the computational burden of feature value extraction. That is, feature values are not calculated until those feature values are to be evaluated by a machine-learned model. For example, when the machine-learned model is based on a random forest, feature values are only computed as the random forest hits nodes where the random forest needs those feature values.

Figure 6:
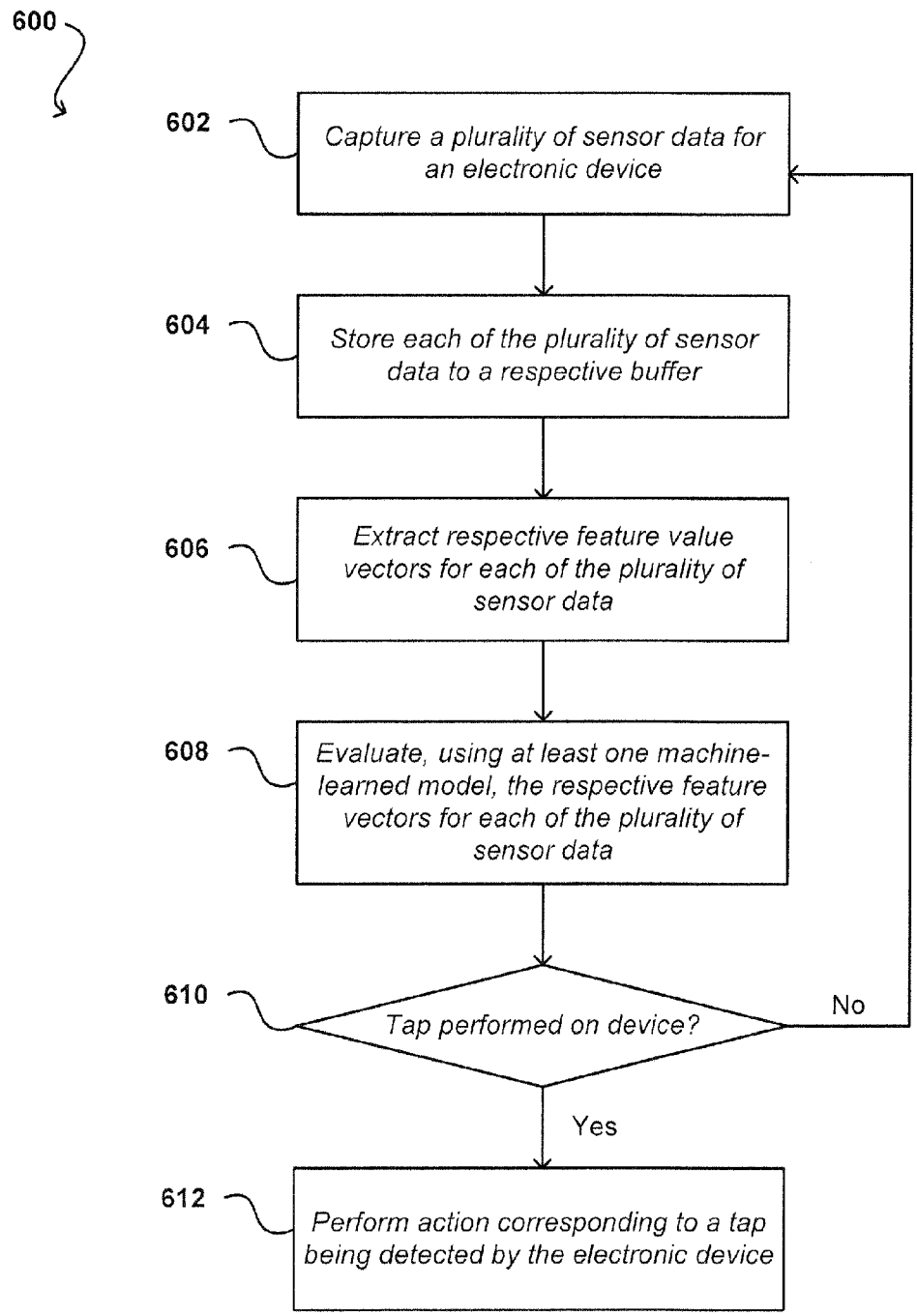
FIG. 6 illustrates an example process for detecting a tap or multiple taps performed on an electronic device for controlling the device in accordance with an embodiment.

FIG. 6 illustrates an example process 600 for detecting a tap or multiple taps to an electronic device for controlling the device in accordance with an embodiment. The process may be initiated upon powering on of a display of a computing device, such as if the process is performed as part of a home screen application. In other embodiments, a user interface for an application may be based on tap detection, and the process can be initiated by starting up the application. The process may begin by capturing a plurality of sensor data for the electronic device 602. The sensor data can include respective inertial sensor data from one or more axes of one or more inertial sensors of the device. In some embodiments, the sensor data can also include respective magnetometer data from each axis of a magnetometer of the device, respective audio data from one or more microphones of the device, respective proximity data from one or more proximity sensors of the device, respective light level data from one or more ambient light sensors of the device, and/or respective image data from one or more cameras of the device. In some embodiments, the sensor readings can be interpolated to produce sensor readings at a fixed time interval. For example, although an accelerometer and a gyroscope may be sampled at a same interval (e.g., 100 Hz), one of the accelerometer or the gyroscope may correspond to a different offset from the other. As another example, the sampling rate of individual sensors may average out to a desired rate but can be inexact, and thus sensor readings can have slightly different timestamps. Thus, in these situations, the sensor readings can be interpolated to account for such differences. Approaches for interpolating the sensor readings include nearest neighbor interpolation, linear interpolation, quadratic interpolation, or spline interpolation methods, among others. In other embodiments, the sensor readings are not interpolated and the sensor readings are utilized as they are obtained such that respective sensor readings may not correspond to a uniform time interval. Interpolation may be necessary in some embodiments when signals are sampled at the same rate but with different offsets. A simple example of this is when the accelerometer is sampled at 100 ms intervals at 0, 100, 200, 300 ms, and the gyroscope is sampled at the same interval but a different offset, such as 50, 150, 250, 350 ms. Sampling can be performed by many different methods, all fairly common: nearest neighbor interpolation, linear interpolation, quadratic interpolation, or any Variety of spline interpolation methods.

After the plurality of sensor data is captured, each of the sensor data can be stored in a separate buffer 604. In an embodiment, a respective circular buffer $V_s$ of fixed length is used for storing each of the plurality of sensor data. For example, the sensor data from each axis of the accelerometer can be stored in $V_{accel\_x}$, $V_{accel\_y}$, and $V_{accel\_z}$, the sensor data from each axis of the gyroscope can be stored in $V_{gyro\_x}$, $V_{gyro\_y}$, and $V_{gyro\_z}$, the sensor data from each axis of the magnetometer can be stored in $V_{magnet\_x}$, $V_{magnet\_y}$, and $V_{magnet\_z}$, etc. Respective feature value vectors for each of the sensors can then be determined 606 using the respective buffer corresponding to a particular sensor and the feature pool. In various embodiments, integral buffers $I_s$ can be utilized for quickly computing the feature vectors. As discussed, integral buffer $I_s$ for a buffer of sensor data $V_s$ can be generated by feeding each sensor value $s_n$ to a fixed-length cumulative buffer $I_s$, where each element n in the buffer $I_s$ is the summation of n and all of the elements prior to n. The integral buffer $I_s$ for a buffer of sensor data $V_s$ can significantly reduce the calculation cost for computing the feature vector for $V_s$ because the sum of a region of $V_s$ from k to n is the difference between $I_s(n)$ and $I_s(k-1)$. In various embodiments, the sampling rate for capturing the sensor data is 100 Hz. In some embodiments, $I_s$ is continually updated as new sensor readings come in. In some embodiments, feature value extraction 606 can also occur at a same interval as the capturing of the sensor data. In other embodiments, the sensor data and integral buffer can be buffered for a period of time before feature vectors are calculated.

The process 600 continues by evaluating the respective feature vectors for each of the plurality of the sensor data according to a machine-learned model 608. The machine-learned model can be based on one of several supervised learning techniques, including decision trees, random forest, boosting, support vector machines, neural networks, logistic regression, among others. The respective feature vectors for each of the plurality of sensor are provided as input to the machine-learned model, and the machine-learned model classifies the respective feature vectors as corresponding to a tap of the device or not corresponding to a tap of the device 610. If the respective feature vectors are determined to not correspond to a tap of the device, the process 600 can be re-initiated by capturing new sensor data 602. If the respective feature vectors are determined to correspond to a tap of the device, the tap can be interpreted as an input gesture and an action can be performed 612, such as powering off the device, controlling audio, clearing notifications or screen alerts, among other actions.

In some embodiments, feature value extraction and classification by the machine-learned model occur at a similar rate as the rate at which sensor data is captured (e.g., 100 Hz). In other embodiments, feature extraction and classification are performed at a less frequent rate for power-saving purposes.

In various embodiments, multiple taps of the device can be detected by recognizing single taps that occur in close temporal proximity or that occur within a threshold of time of each other. For example, a pair of single taps that occur within the threshold of time can be detected as a double tap. A similar approach can be extended to other tap patterns, such as triple taps, quadruple taps, etc.

Figure 7:
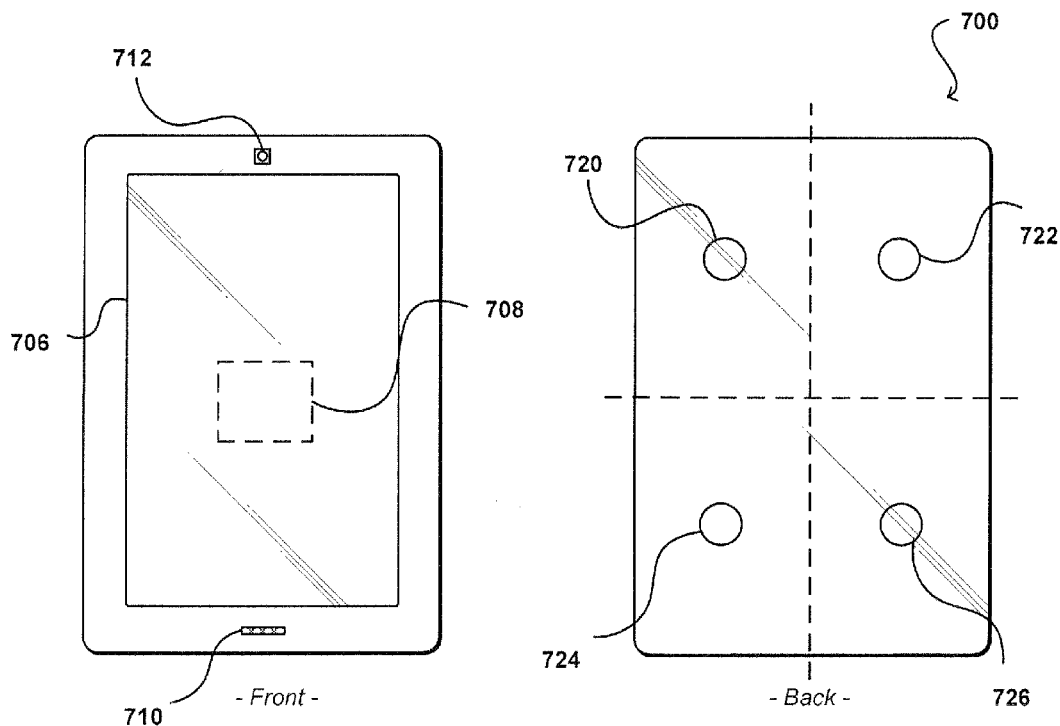
FIG. 7 illustrates an example of an electronic device that can be used in accordance with various embodiments.

FIG. 7 illustrates an example electronic device 700 that can be used to perform approaches described in accordance with various embodiments. The electronic device includes an inertial sensor 708, such as an accelerometer, a gyroscope, or a combination thereof, that can be used to detect motion and/or orientation of the device, which can in turn be analyzed to determine whether the device has received a single tap or multiple taps for controlling the device in accordance with various embodiments. The electronic device can also include one or more microphones 710 that are configured to run concurrently with the inertial sensor. Feature vectors can be extracted from the sound signals captured by the one or more microphones, and these feature vectors can be utilized as additional parameters for machine-learning.

The electronic device can also include one or more cameras 712 for detecting a portion of the user (e.g., user's face and/or head) and/or something associated with the user (e.g., something in the user's hand, that the user is wearing, etc.). In some embodiments, face or head detection can be used as an additional cue to determine whether the user has intended to tap the device to control the device. For example, the electronic device may be configured to recognize taps as input for controlling the device only when the user is actively operating the device as opposed to when the device is located in one of the user's pockets, the user's bag, or some other location away from the user. Face or head detection can be utilized as an indication that the user is actively operating the device. Approaches for combining face and/or head detection with tap detection are discussed in co-pending U.S. patent application Ser. No. 14/307,470, filed Jun. 17, 2014, entitled "Detecting Tap-Based User Input on a Mobile Device," which is incorporated by reference herein.

In some embodiments, an electronic device can include one or more regions on various surfaces of the device indicating where the user may tap on the device such that the device is more likely to detect the tap as input for controlling the device. In this example, the device 700 is capable of differentiating among back taps to a northwest quadrant, northeast quadrant, southwest quadrant, and southeast quadrant of the device. To facilitate tap detection at these various quadrants, tactile cues or indicators 720, 722, 724, and 726 may be provided approximately at the center of the northwest quadrant, northeast quadrant, southwest quadrant, and southeast quadrant, respectively. Tactile cues may have unique sensor signatures, such as a pattern of raised bumps, lines, or ridges, that create a unique pattern when the user drags a finger across the surface. The unique pattern can direct a user to tap the surface of the device at these locations so that the sensor data captured when the user taps these locations more closely matches training data captured by other users tapping at these locations. In addition, touching or tapping the raised bumps or lines may generate unique sensor data, which can further facilitate recognition of user input to these locations using a machine-learning approach. Although, the tactile cues or indicators are disposed on the back surface of the device, it should be understood that these cues or indicators can also be disposed at various other locations, including the top, bottom, sides, and front of the device in various embodiments. In some embodiments, visual indicators, such as stickers or utilization of a different color from the rest of the surface, can be used in addition or alternatively to tactical cues.

Figure 8:
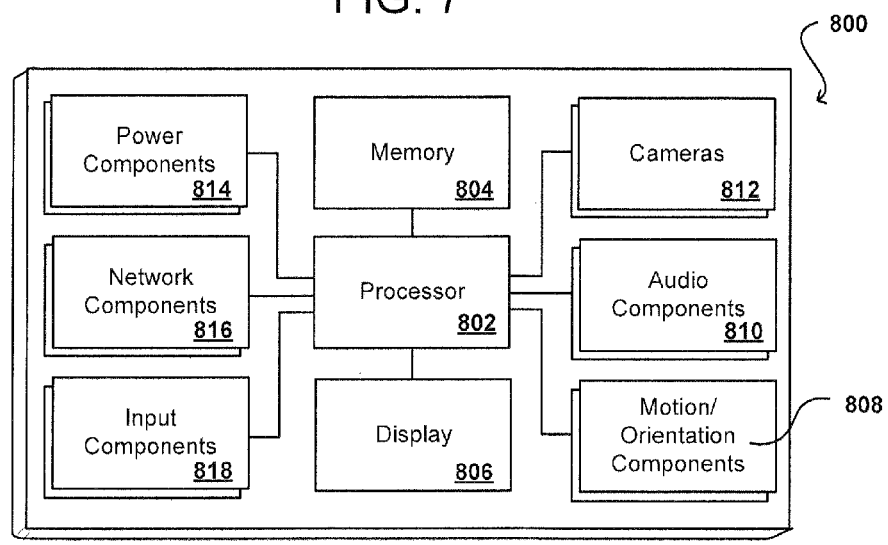
FIG. 8 illustrates an example configuration of components of an electronic device such as that illustrated in FIG. 7.

FIG. 8 illustrates a logical arrangement of a set of general components of an example electronic device 800 such as the device 700 described with respect to FIG. 7. In this example, the device includes a processor 802 for executing instructions that can be stored in a memory component 804. As would be apparent to one of ordinary skill in the art, the memory component can include many types of memory, data storage, or non-transitory computer-readable storage media, such as a first data storage for program instructions for execution by the processor 802, a separate storage for images or data, a removable memory for sharing information with other devices, etc. The device typically will include some type of display element 806, such as a touchscreen, electronic ink (e-ink), organic light emitting diode (OLED), liquid crystal display (LCD), etc., although devices such as portable media players might convey information via other means, such as through audio speakers. In at least some embodiments, the display screen provides for touch or swipe-based input using, for example, capacitive or resistive touch technology.

The device 800 also can include one or more orientation and/or motion sensors 808. Such sensor(s) can include an accelerometer or gyroscope operable to detect an orientation and/or change in orientation, or an electronic or digital compass, which can indicate a direction in which the device is determined to be facing. The mechanism(s) also (or alternatively) can include or comprise a global positioning system (GPS) or similar positioning element operable to determine relative coordinates for a position of the electronic device, as well as information about relatively large movements of the device. The device can include other elements as well, such as may enable location determinations through triangulation or another such approach. These mechanisms can communicate with the processor 802, whereby the device can perform any of a number of actions described or suggested herein.

The example device can include at least one audio component 810, such as a mono or stereo microphone or microphone array, operable to capture audio information from at least one primary direction. A microphone can be a uni- or omnidirectional microphone as known for such devices. The device in many embodiments will also include one or more cameras or image sensors 812 for capturing image or video content. A camera can include, or be based at least in part upon any appropriate technology, such as a CCD or CMOS image sensor having a sufficient resolution, focal range, viewable area, to capture an image of the user when the user is operating the device. An image sensor can include a camera or infrared sensor that is able to image projected images or other objects in the vicinity of the device. Methods for capturing images or video using a camera with an electronic device are well known in the art and will not be discussed herein in detail. It should be understood that image capture can be performed using a single image, multiple images, periodic imaging, continuous image capturing, image streaming, etc. Further, a device can include the ability to start and/or stop image capture, such as when receiving a command from a user, application, or other device.

The electronic device 800 includes at least one capacitive component or other proximity sensor, which can be part of, or separate from, the display assembly. In at least some embodiments the proximity sensor can take the form of a capacitive touch sensor capable of detecting the proximity of a finger or other such object. The electronic device also includes various power components 814 known in the art for providing power to an electronic device, which can include capacitive charging elements for use with a power pad or similar device. The electronic device can include one or more communication elements or networking sub-systems 816, such as a Bluetooth, RF, wired, or wireless communication system. The device in many embodiments can communicate with a network, such as the Internet, and may be able to communicate with other such devices. In some embodiments the device can include at least one additional input element 818 able to receive conventional input from a user. This conventional input can include, for example, a push button, touch pad, touchscreen, wheel, joystick, keyboard, mouse, keypad, or any other such component or element whereby a user can input a command to the device. In some embodiments, however, such a device might not include any buttons at all, and might be controlled only through a combination of visual and audio commands, such that a user can control the device without having to be in contact with the device.

In some embodiments, the device 800 can include the ability to activate and/or deactivate detection and/or command modes, such as when receiving a command from a user or an application, or retrying to determine an audio input or video input, etc. For example, a device might not attempt to detect or communicate with devices when there is not a user in the room. If a proximity sensor of the device, such as an IR sensor, detects a user entering the room, for instance, the device can activate a detection or control mode such that the device can be ready when needed by the user, but conserve power and resources when a user is not nearby.

In some embodiments, the electronic device 800 may include a light-detecting element that is able to determine whether the device is exposed to ambient light or is in relative or complete darkness. Such an element can be beneficial in a number of ways. For example, the light-detecting element can be used to determine when a user is holding the device up to the user's face (causing the light-detecting element to be substantially shielded from the ambient light), which can trigger an action such as the display element to temporarily shut off (since the user cannot see the display element while holding the device to the user's ear). The light-detecting element could be used in conjunction with information from other elements to adjust the functionality of the device. For example, if the device is unable to detect a user's view location and a user is not holding the device but the device is exposed to ambient light, the device might determine that it has likely been set down by the user and might turn off the display element and disable certain functionality. If the device is unable to detect a user's view location, a user is not holding the device and the device is further not exposed to ambient light, the device might determine that the device has been placed in a bag or other compartment that is likely inaccessible to the user and thus might turn off or disable additional features that might otherwise have been available. In some embodiments, a user must either be looking at the device, holding the device or have the device out in the light in order to activate certain functionality of the device. In other embodiments, the device may include a display element that can operate in different modes, such as reflective (for bright situations) and emissive (for dark situations). Based on the detected light, the device may change modes.

In some embodiments, the device 800 can disable features for reasons substantially unrelated to power savings. For example, the device can use voice recognition to determine people near the device, such as children, and can disable or enable features, such as Internet access or parental controls, based thereon. Further, the device can analyze recorded noise to attempt to determine an environment, such as whether the device is in a car or on a plane, and that determination can help to decide which features to enable/disable or which actions are taken based upon other inputs. If speech or voice recognition is used, words can be used as input, either directly spoken to the device or indirectly as picked up through conversation. For example, if the device determines that it is in a car, facing the user and detects a word such as "hungry" or "eat," then the device might turn on the display element and display information for nearby restaurants, etc. A user can have the option of turning off voice recording and conversation monitoring for privacy and other such purposes.

In some of the above examples, the actions taken by the device relate to deactivating certain functionality for purposes of reducing power consumption. It should be understood, however, that actions can correspond to other functions that can adjust similar and other potential issues with use of the device. For example, certain functions, such as requesting Web page content, searching for content on a hard drive and opening various applications, can take a certain amount of time to complete. For devices with limited resources, or that have heavy usage, a number of such operations occurring at the same time can cause the device to slow down or even lock up, which can lead to inefficiencies, degrade the user experience and potentially use more power. In order to address at least some of these and other such issues, approaches in accordance with various embodiments can also utilize information such as user gaze direction to activate resources that are likely to be used in order to spread out the need for processing capacity, memory space and other such resources.

In some embodiments, the device can have sufficient processing capability, and the camera and associated image analysis algorithm(s) may be sensitive enough to distinguish between the motion of the device, motion of a user's head, motion of the user's eyes and other such motions, based on the captured images alone. In other embodiments, such as where it may be desirable for an image process to utilize a fairly simple camera and image analysis approach, it can be desirable to include at least one orientation determining element that is able to determine a current orientation of the device. In one example, the one or more orientation and/or motion sensors may comprise a single- or multi-axis accelerometer that is able to detect factors such as three-dimensional position of the device and the magnitude and direction of movement of the device, as well as vibration, shock, etc. Methods for using elements such as accelerometers to determine orientation or movement of a device are also known in the art and will not be discussed herein in detail. Other elements for detecting orientation and/or movement can be used as well within the scope of various embodiments for use as the orientation determining element. When the input from an accelerometer or similar element is used along with the input from the camera, the relative movement can be more accurately interpreted, allowing for a more precise input and/or a less complex image analysis algorithm.

When using a camera of the electronic device to detect motion of the device and/or user, for example, the electronic device can use the background in the images to determine movement. For example, if a user holds the device at a fixed orientation (e.g. distance, angle, etc.) to the user and the user changes orientation to the surrounding environment, analyzing an image of the user alone will not result in detecting a change in an orientation of the device. Rather, in some embodiments, the electronic device can still detect movement of the device by recognizing the changes in the background imagery behind the user. So, for example, if an object (e.g., a window, picture, tree, bush, building, car, etc.) moves to the left or right in the image, the device can determine that the device has changed orientation, even though the orientation of the device with respect to the user has not changed. In other embodiments, the device may detect that the user has moved with respect to the device and adjust accordingly. For example, if the user tilts his head to the left or right with respect to the device, the content rendered on the display element may likewise tilt to keep the content in orientation with the user.

Figure 9:
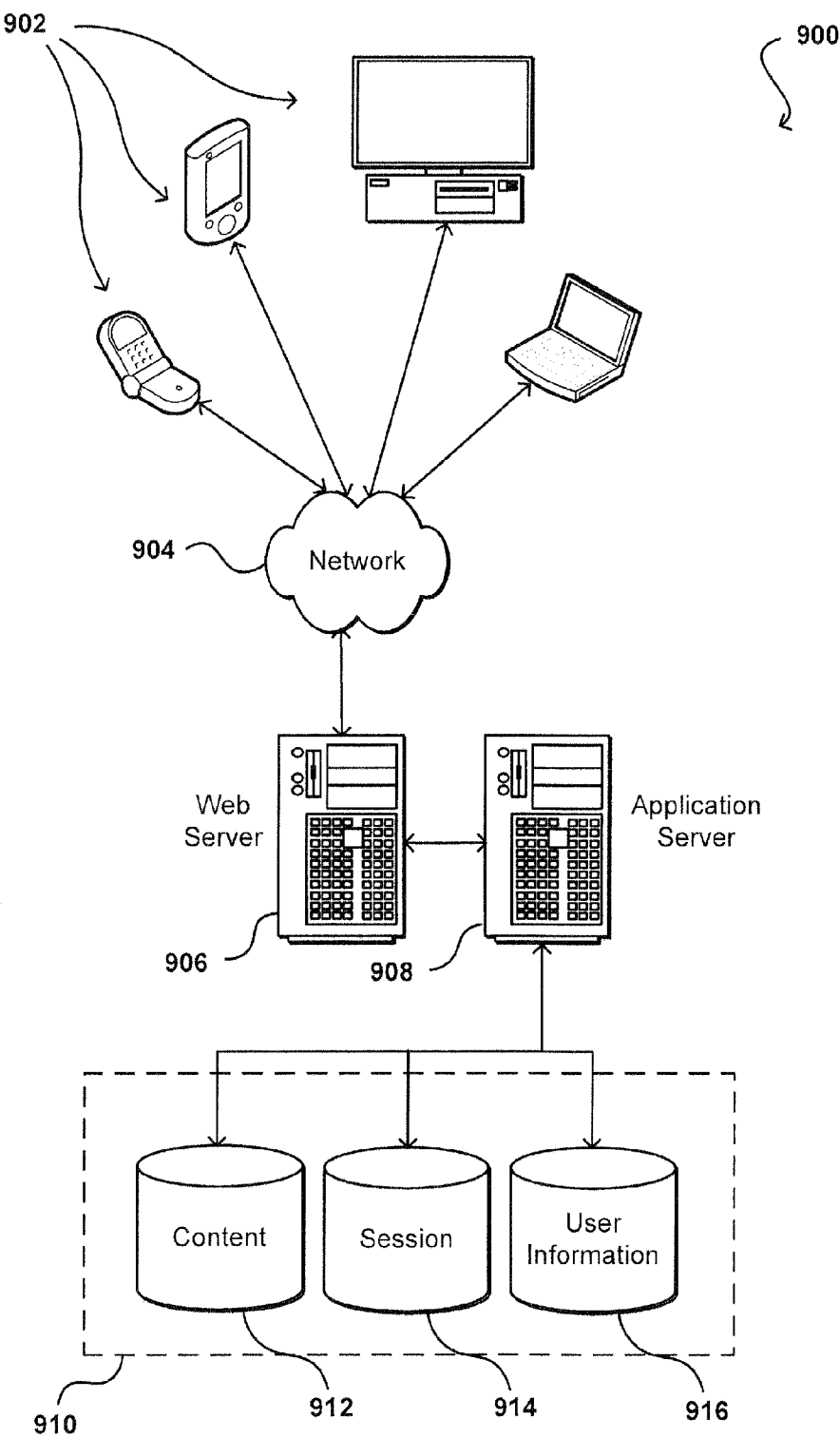
FIG. 9 illustrates an example environment in which various embodiments can be implemented.

As discussed, different approaches can be implemented in various environments in accordance with the described embodiments. For example, FIG. 9 illustrates an example of an environment 900 for implementing aspects in accordance with various embodiments. As will be appreciated, although a Web-based environment is used for purposes of explanation, different environments may be used, as appropriate, to implement various embodiments. The system includes an electronic client device 902, which can include any appropriate device operable to send and receive requests, messages or information over an appropriate network 904 and convey information back to a user of the device. Examples of such client devices include personal computers, cell phones, handheld messaging devices, laptop computers, set-top boxes, personal data assistants, electronic book readers and the like. The network can include any appropriate network, including an intranet, the Internet, a cellular network, a local area network or any other such network or combination thereof. Components used for such a system can depend at least in part upon the type of network and/or environment selected. Protocols and components for communicating via such a network are well known and will not be discussed herein in detail. Communication over the network can be enabled via wired or wireless connections and combinations thereof. In this example, the network includes the Internet, as the environment includes a Web server 906 for receiving requests and serving content in response thereto, although for other networks, an alternative device serving a similar purpose could be used, as would be apparent to one of ordinary skill in the art.

The illustrative environment includes at least one application server 908 and a data store 910. It should be understood that there can be several application servers, layers or other elements, processes or components, which may be chained or otherwise configured, which can interact to perform tasks such as obtaining data from an appropriate data store. As used herein, the term "data store" refers to any device or combination of devices capable of storing, accessing and retrieving data, which may include any combination and number of data servers, databases, data storage devices and data storage media, in any standard, distributed or clustered environment. The application server 908 can include any appropriate hardware and software for integrating with the data store 910 as needed to execute aspects of one or more applications for the client device and handling a majority of the data access and business logic for an application. The application server provides access control services in cooperation with the data store and is able to generate content such as text, graphics, audio and/or video to be transferred to the user, which may be served to the user by the Web server 906 in the form of HTML, XML or another appropriate structured language in this example. The handling of all requests and responses, as well as the delivery of content between the client device 902 and the application server 908, can be handled by the Web server 906. It should be understood that the Web and application servers are not required and are merely example components, as structured code discussed herein can be executed on any appropriate device or host machine as discussed elsewhere herein.

The data store 910 can include several separate data tables, databases or other data storage mechanisms and media for storing data relating to a particular aspect. For example, the data store illustrated includes mechanisms for storing content (e.g., production data) 912 and user information 916, which can be used to serve content for the production side. The data store is also shown to include a mechanism for storing log or session data 914. It should be understood that there can be many other aspects that may need to be stored in the data store, such as page image information and access rights information, which can be stored in any of the above listed mechanisms as appropriate or in additional mechanisms in the data store 910. The data store 910 is operable, through logic associated therewith, to receive instructions from the application server 908 and obtain, update or otherwise process data in response thereto. In one example, a user might submit a search request for a certain type of item. In this case, the data store might access the user information to verify the identity of the user and can access the catalog detail information to obtain information about items of that type. The information can then be returned to the user, such as in a results listing on a Web page that the user is able to view via a browser on the user device 902. Information for a particular item of interest can be viewed in a dedicated page or window of the browser.

Each server typically will include an operating system that provides executable program instructions for the general administration and operation of that server and typically will include computer-readable medium storing instructions that, when executed by a processor of the server, allow the server to perform its intended functions. Suitable implementations for the operating system and general functionality of the servers are known or commercially available and are readily implemented by persons having ordinary skill in the art, particularly in light of the disclosure herein.

The environment in one embodiment is a distributed computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 9. Thus, the depiction of the system 900 in FIG. 9 should be taken as being illustrative in nature and not limiting to the scope of the disclosure.

The various embodiments can be further implemented in a wide variety of operating environments, which in some cases can include one or more user computers or computing devices which can be used to operate any of a number of applications. User or client devices can include any of a number of general purpose personal computers, such as desktop or laptop computers running a standard operating system, as well as cellular, wireless and handheld devices running mobile software and capable of supporting a number of networking and messaging protocols. Such a system can also include a number of workstations running any of a variety of commercially-available operating systems and other known applications for purposes such as development and database management. These devices can also include other electronic devices, such as dummy terminals, thin-clients, gaming systems and other devices capable of communicating via a network.

Most embodiments utilize at least one network that would be familiar to those skilled in the art for supporting communications using any of a variety of commercially-available protocols, such as TCP/IP, OSI, FTP, UPnP, NFS, CIFS and AppleTalk. The network can be, for example, a local area network, a wide-area network, a virtual private network, the Internet, an intranet, an extranet, a public switched telephone network, an infrared network, a wireless network and any combination thereof.

In embodiments utilizing a Web server, the Web server can run any of a variety of server or mid-tier applications, including HTTP servers, FTP servers, CGI servers, data servers, Java servers and business application servers. The server(s) may also be capable of executing programs or scripts in response requests from user devices, such as by executing one or more Web applications that may be implemented as one or more scripts or programs written in any programming language, such as Java®, C, C# or C++ or any scripting language, such as Perl, Python or TCL, as well as combinations thereof. The server(s) may also include database servers, including without limitation those commercially available from Oracle®, Microsoft®, Sybase® and IBM®.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network (SAN) familiar to those skilled in the art. Similarly, any necessary files for performing the functions attributed to the computers, servers or other network devices may be stored locally and/or remotely, as appropriate. Where a system includes computerized devices, each such device can include hardware elements that may be electrically coupled via a bus, the elements including, for example, at least one central processing unit (CPU), at least one input device (e.g., a mouse, keyboard, controller, touch-sensitive display element or keypad) and at least one output device (e.g., a display device, printer or speaker). Such a system may also include one or more storage devices, such as disk drives, optical storage devices and solid-state storage devices such as random access memory (RAM) or read-only memory (ROM), as well as removable media devices, memory cards, flash cards, etc.

Such devices can also include a computer-readable storage media reader, a communications device (e.g., a modem, a network card (wireless or wired), an infrared communication device) and working memory as described above. The computer-readable storage media reader can be connected with, or configured to receive, a computer-readable storage medium representing remote, local, fixed and/or removable storage devices as well as storage media for temporarily and/or more permanently containing, storing, transmitting and retrieving computer-readable information. The system and various devices also typically will include a number of software applications, modules, services or other elements located within at least one working memory device, including an operating system and application programs such as a client application or Web browser. It should be appreciated that alternate embodiments may have numerous variations from that described above. For example, customized hardware might also be used and/or particular elements might be implemented in hardware, software (including portable software, such as applets) or both. Further, connection to other computing devices such as network input/output devices may be employed.

Storage media and computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules or other data, including RAM, ROM, EEPROM, flash memory or other memory technology, CD-ROM, digital versatile disk (DVD) or other optical storage, magnetic cassettes, magnetic tape, magnetic disk storage or other magnetic storage devices or any other medium which can be used to store the desired information and which can be accessed by a system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

What is claimed is:

1. A computer-implemented method for detecting a tap as input for an electronic device, comprising:
    capturing a sensor data vector corresponding to a one-dimensional signal from at least one of an accelerometer or a gyroscope;
    calculating an integral buffer corresponding to the sensor data vector by summing: (a) a sensor signal value at each position in the sensor data vector corresponding to the position of the integral buffer, and (b) sensor signal values, prior to the position, in the sensor data vector;
    calculating a feature value vector using: (a) the integral buffer, and (b) a plurality of one-dimensional Haar-like features comprising sequences of numbers of equal length including a first sequence of one or more negative ones and a second sequence of one or more positive ones;
    for a decision tree classifier of a random forest classifier that is trained to detect that the tap has been performed on a back surface of the electronic device, evaluating a respective subset of feature values of the feature value vector with respect to the decision tree classifier to obtain a respective classification; and
    determining that the tap has been performed on the back surface of the electronic device based on the respective classification obtained from each decision tree classifier of the random forest classifier.

2. The computer-implemented method of claim 1, further comprising:
    determining a first period of time corresponding to when the tap has been performed on the back surface of the electronic device;
    determining that a second tap has been performed on the back surface of the electronic device and a second period of time corresponding to when the second tap has been performed; and
    determining that a double tap has been performed on the back surface of the electronic device by analyzing the first period of the time and the second period of time with respect to a time threshold.

3. The computer-implemented method of claim 1, further comprising:
    capturing training data from one or more electronic devices, the training data comprising sensor data from each of the one or more electronic devices, the training data corresponding to multiple instances of one or more back surfaces of the one or more electronic devices being tapped;

calculating a plurality of feature value vectors using the training data and the plurality of one-dimensional Haar-like features; and generating each decision tree classifier of the random forest classifier using the plurality of feature value vectors.

4. The computer-implemented method of claim 1, wherein capturing the sensor data vector and calculating the integral buffer occur at a first rate, and calculating the feature value vector and evaluating the feature value vector with respect to each decision tree classifier occur at a second rate that is less frequent than the first rate.

5. A computer-implemented method, comprising:
capturing a sensor data vector using an inertial sensor, the sensor data vector corresponding to a one-dimensional signal of the inertial sensor;

determining a feature value vector based at least in part upon the sensor data vector and a plurality of one-dimensional features;

evaluating at least one portion of the feature value vector using a machine-learned model that is trained to analyze the feature value vector to determine whether the feature value vector corresponds to one or more taps being performed on an electronic device; and determining that a tap has been performed on the electronic device based at least in part upon evaluating the at least one portion of the feature value vector using the machine-learned model.

6. The computer-implemented method of claim 5, wherein calculating the feature value vector includes:
calculating an integral buffer corresponding to the sensor data vector by summing: (a) a sensor signal value at each position in the sensor data vector corresponding to the position of the integral buffer, and (b) sensor signal values, prior to the position, in the sensor data vector, wherein the feature value vector is calculated using the integral buffer and the plurality of one-dimensional feature.

7. The computer-implemented method of claim 5, wherein each of the plurality of one-dimensional features comprise Haar-like features each including a plurality of sequences of numbers of equal length including a first sequence of one or more negative ones and a second sequence of one or more ones.

8. The computer-implemented method of claim 7, wherein the plurality of one-dimensional features comprises a one-dimensional Haar-like feature further including a third sequence of one or more negative ones.

9. The computer-implemented method of claim 5, wherein determining that the tap has been performed on the electronic device includes:
determining that the tap has been performed on one of a top surface, a bottom surface, a side surface, a front surface, or a back surface of the electronic device.

10. The computer-implemented method of claim 9, wherein the machine-learned model is a multiclass classifier.

11. The computer-implemented method of claim 9, wherein the machine-learned model is a binary classifier and determining that the tap has been performed on the one of the top surface, the bottom surface, the side surface, the front surface, or the back surface of the electronic device includes:
evaluating the at least one portion of the feature value vector using one or more additional machine-learned models.

12. The computer-implemented method of claim 5, further comprising:
determining a first period of time corresponding to when the tap has been performed on the electronic device;

determining that a second tap has been performed on the electronic device and a second period of time corresponding to when the second tap has been performed; and determining that a double tap has been performed on the electronic device by analyzing the first period of the time and the second period of time with respect to a time threshold.

13. The computer-implemented method of claim 5, further comprising:
capturing training data from one or more electronic devices, the training data comprising sensor data from each of the one or more electronic devices, the training data corresponding to multiple instances of the one or more electronic devices being tapped;

calculating a plurality of feature value vectors using the training data and the plurality of one-dimensional features; and generating the machine-learned model based at least in part upon the plurality of feature value vectors and a machine-learning algorithm, the machine-learning algorithm being based at least in part upon one of a decision tree, a random forest, boosting, a support vector machine, a neural network, or logistic regression.

14. The computer-implemented method of claim 5, further comprising:
capturing at least one second sensor data vector using at least one of a magnetometer, a microphone, a proximity sensor, an ambient light sensor, or a camera; and determining at least one second feature value vector based at least in part upon the at least one second sensor data vector and the plurality of one-dimensional features, wherein determining that the tap has been performed on the electronic device is further based at least in part upon evaluating at least one portion of the at least one second sensor data vector using the machine-learned model.

15. The computer-implemented method of claim 14, further comprising:
interpolating the sensor data vector and the at least one second sensor data vector according to a fixed time interval.

16. The computer-implemented method of claim 5, wherein capturing the sensor data vector occurs at a first rate, and determining the feature value vector and evaluating the at least one portion of the feature value vector using the machine-learned model occurs at a second rate that is less frequent than the first rate.

17. An electronic device, comprising:
a processor;
an inertial sensor; and
memory including instructions that, upon being executed by the processor, cause the electronic device to:
obtain a sensor data vector using the inertial sensor, the sensor data vector corresponding to a one-dimensional signal of the inertial sensor;

determine a feature value vector based at least in part upon the sensor data vector and a plurality of one-dimensional features;

determine at least one portion of the feature value vector using a machine-learned model that is trained to analyze the feature value vector to determine whether the feature value vector corresponds to one or more taps being performed on the electronic device; and determine that a tap has been performed on the electronic device based at least in part upon evaluating the at least one portion of feature value vector using the machine-learned model.

18. The electronic device of claim 17, further comprising at least one of a magnetometer, a microphone, a proximity sensor, an ambient light sensor, or a camera, wherein the instructions, upon being executed, further cause the electronic device to:
- capture at least one second sensor data vector using the at least one of the magnetometer, the microphone, the proximity sensor, the ambient light sensor, or the camera; and
- determine at least one second feature value vector based at least in part upon the at least one second sensor data vector and the plurality of one-dimensional features,
- wherein determining that the tap has been performed on the electronic device is further based at least in part upon evaluating at least one portion of the at least one second sensor data vector using the machine-learned model.

19. The electronic device of claim 17, further comprising one or more tactile indicators for indicating where to tap on the electronic device.

20. The electronic device of claim 17, wherein the instructions, upon being executed, further cause the electronic device to:
- determine a first period of time corresponding to when the tap has been performed on the electronic device;
- determine that a second tap has been performed on the electronic device and a second period of time corresponding to when the second tap has been performed; and
- determine that a double tap has been performed on the electronic device by analyzing the first period of the time and the second period of time with respect to a time threshold.

* * * * *